United States Patent
Pruecklmayer et al.

(10) Patent No.: US 7,092,517 B2
(45) Date of Patent: Aug. 15, 2006

(54) APPARATUS AND METHOD FOR REGULATING AN SLIC SUPPLY VOLTAGE

(75) Inventors: Stephan Pruecklmayer, Munich (DE); Michael Schoenberger, San Jose, CA (US)

(73) Assignee: Infineon Technologies AG, Munich (DE)

(*) Notice: Subject to any disclaimer, the term of this patent is extended or adjusted under 35 U.S.C. 154(b) by 384 days.

(21) Appl. No.: 09/950,107

(22) Filed: Sep. 10, 2001

(65) Prior Publication Data

US 2002/0048362 A1   Apr. 25, 2002

(30) Foreign Application Priority Data

Sep. 12, 2000 (DE) .............................. 100 45 015

(51) Int. Cl.
*H04M 1/00* (2006.01)
*H04M 9/00* (2006.01)
(52) U.S. Cl. ................................................. 379/413
(58) Field of Classification Search ........... 379/399.01, 379/322–324, 413
See application file for complete search history.

(56) References Cited

U.S. PATENT DOCUMENTS

| | | | |
|---|---|---|---|
| 4,315,106 A * | 2/1982 | Chea, Jr. .................. | 379/377 |
| 5,323,461 A * | 6/1994 | Rosenbaum et al. ... | 379/399.01 |
| 5,754,644 A | 5/1998 | Akhteruzzaman | |
| 6,735,302 B1 * | 5/2004 | Caine et al. ............. | 379/405 |

FOREIGN PATENT DOCUMENTS

| | | |
|---|---|---|
| DE | 3035274 C2 | 12/1988 |
| EP | 0269579 A2 | 6/1988 |
| WO | WO 97/06630 | 2/1997 |
| WO | WO 99/26348 | 5/1999 |
| WO | WO 99/63745 | 12/1999 |

* cited by examiner

*Primary Examiner*—Curtis Kuntz
*Assistant Examiner*—Alexander Jamal
(74) *Attorney, Agent, or Firm*—Jenkins, Wilson, Taylor & Hunt, P.A.

(57) ABSTRACT

Control circuit and method for regulating the supply voltage of an SLIC circuit (15), having a monitoring circuit (36) for calculating an SLIC supply voltage which is required to reach a nominal supply current ($I_{nom}$) for an analogue terminal (2) which is connected to the SLIC circuit (15); and having a DC/DC converter (53), which is controlled by the monitoring circuit (36), for converting a battery voltage ($V_{batt}$) to the calculated SLIC supply voltage.

13 Claims, 3 Drawing Sheets

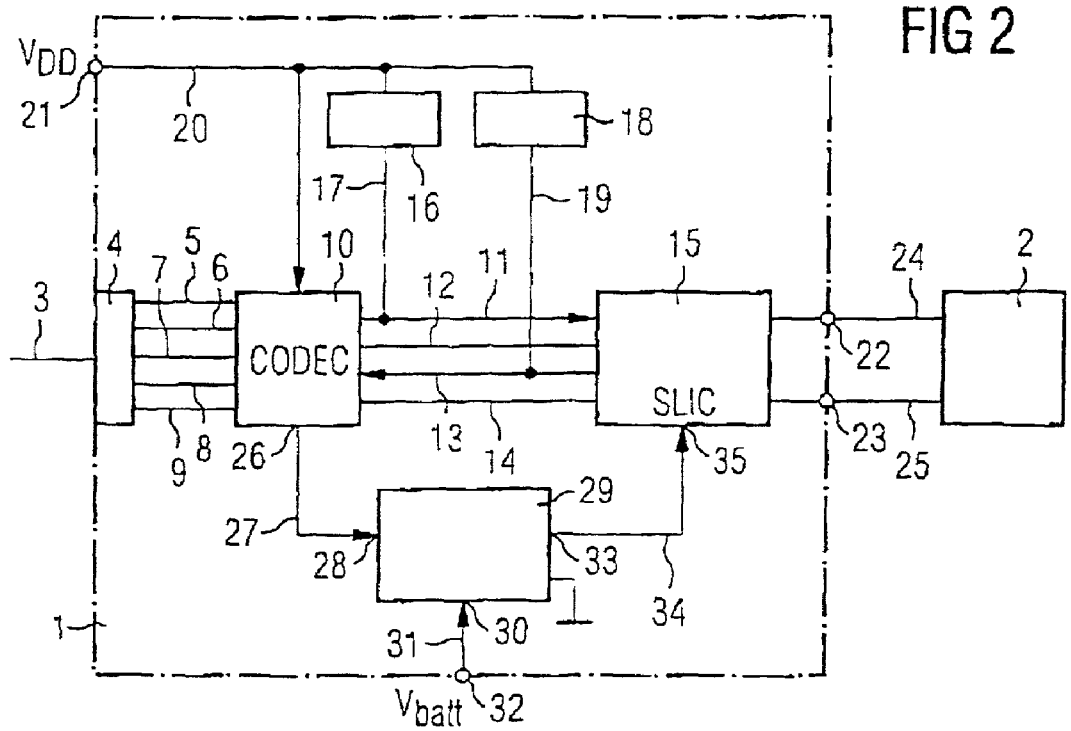
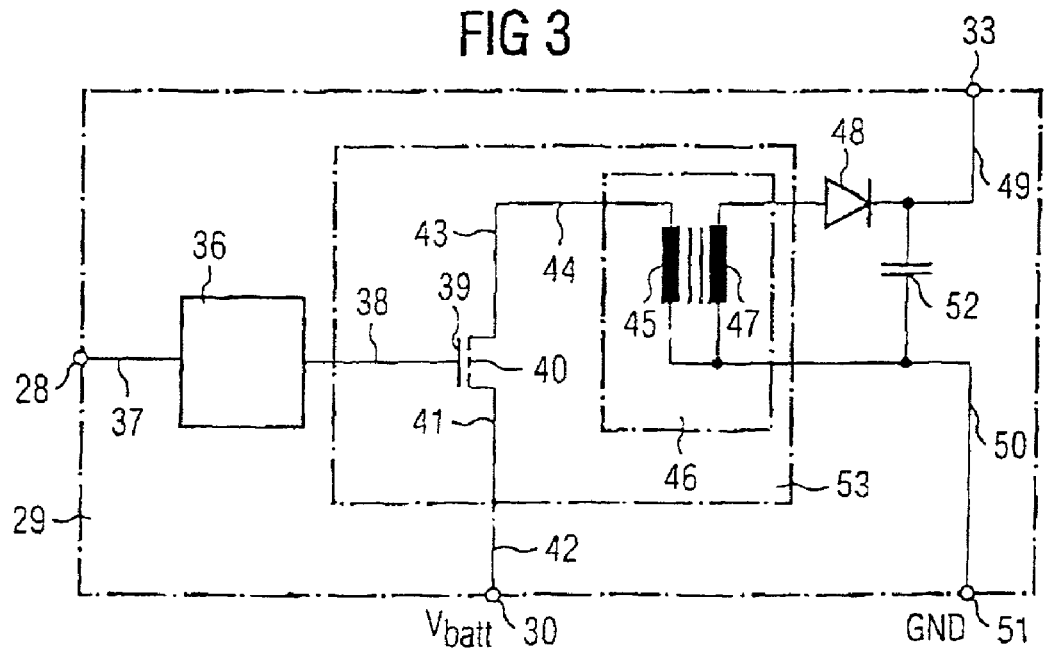

APPARATUS AND METHOD FOR REGULATING AN SLIC SUPPLY VOLTAGE

RELATED ART

FIG. 1 shows an interface for connecting an analog terminal, in particular an analog telephone, to a digital switching system according to the prior art.

The analog terminal is connected via two telephone lines to an SLIC circuit which is integrated in the interface. The SLIC circuit (SLIC: Subscriber Line Interface Circuit) carries out what are referred to as the BORSCHT tasks, namely:

Battery feeding, that is to say remote power supply feed to the terminal,

Overvoltage protection,

Ringing, that is to say calling the subscriber terminal,

Signaling,

Coding, that is to say PCM coding/decoding, and

Hybrid testing, or testing and measurement.

The SLIC circuit contains battery switching devices for applying various battery voltages $V_{batt1}$, $V_{batt2}$, .... The SLIC circuit is connected via a signal receiving line RC and a signal transmitting line TX as well as respectively associated ground lines to a Codec circuit. The SLIC circuit matches the signal which is transmitted on the four lines of the Codec circuit to the analog telephone connecting lines. The Codec circuit receives a PCM-coded digital signal via a data line for transmission of digital data. The interface also contains an FSK circuit (FSK: Frequency Shift Keying) for telephone number display and a DTMF circuit (DTMF: Dual Tone Multi Frequency), which decodes the transmitted tones during a telephone call produced by the analog terminal, so that this dialing information is transmitted for switching.

The power supply for the analog terminal is provided by the SLIC circuit. The SLIC circuit in this case uses a connected battery voltage $V_{batt}$ to produce a feed voltage $V_{feed}$ for application to the two telephone connecting lines. This feed voltage $V_{feed}$ produces a supply current for supplying the terminal. In this case:

$$\Delta U = V_{battery} - V_{DROP} - V_{line} - V_{telephone} \quad (1)$$

where $\Delta U$ is a voltage drop, which is not constant, within the SLIC circuit, $V_{DROP}$ is a constant voltage drop caused by an internal resistance in the SLIC circuit, $V_{line}$ is the voltage drop on the telephone connecting line, and $V_{telephone}$ is the constant telephone supply voltage.

In this case:

$$V_{DROP} = I_{feed} \cdot R_{internal} \quad (2)$$

where:

$I_{feed}$ is the feed current emitted from the SLIC circuit to the telephone connecting line, and $R_{internal}$ is the constant internal resistance of the SLIC circuit.

The voltage $V_{line}$ applied to the telephone connecting line is not constant, and depends on the length, and hence on the resistance, of the telephone line:

$$V_{line} = I_{feed} \cdot R_{line} \quad (3)$$

A greater or lesser voltage is thus dropped on the SLIC circuit depending on the line length L and hence on the line resistance $R_{line}$:

$$P_{loss} = \Delta U \cdot I_{feed} = \Delta R_{line} \cdot I_{feed}^2 \quad (4)$$

The power loss $P_{loss}$ produced in the SLIC circuit produces heat which must be dissipated to the environment. In order to prevent overheating of the interface, and hence an adverse effect on its functions, measures are therefore taken for cooling of and heat dissipation from the SLIC circuit. As the battery voltage $V_{battery}$ rises, the power loss $P_{loss}$ in the SLIC circuit increases. If, conversely, the battery voltage $V_{battery}$ is too low, it is impossible for the SLIC circuit to provide sufficient power to supply the terminal.

In the conventional interface according to the prior art, as is illustrated in FIG. 1, a switching device is therefore provided in the SLIC circuit, and switches between two or more battery voltages $V_{batt}$ depending on the telephone connecting line length L. One disadvantage of switching between different battery voltages $V_{batt}$ is that the circuitry complexity for generation of different battery voltages $V_{batt}$ is relatively high, and this results in only a minor reduction in the power loss $P_{loss}$ within the SLIC circuit.

SUMMARY OF THE INVENTION

The object of the present invention is therefore to provide a method and an apparatus for regulating the supply voltage of an SLIC circuit, in which the power loss produced in the SLIC circuit is minimal.

According to the invention, this is achieved by a method having the features specified in patent claim 1, and by a control circuit having the features specified in patent claim 5.

The invention provides a method for regulating an SLIC supply voltage with minimum power loss, in which case the method has the following steps, namely:

application of a telephone connecting line measurement feed voltage to a telephone line by means of an SLIC circuit, measurement by a monitoring circuit of a telephone line current which flows via the telephone connecting line when the measurement feed voltage is applied, calculation by the monitoring circuit of the required SLIC supply voltage for the SLIC circuit as a function of the measured telephone connecting line current, in which case, with the calculated SLIC supply voltage, the SLIC circuit applies to the telephone line a telephone line feed voltage which produces a predetermined nominal supply current for a terminal which is connected to the telephone connecting lines, and production of the calculated SLIC supply voltage for application to the SLIC circuit.

In one preferred embodiment of the method according to the invention, the SLIC supply voltage for the SLIC circuit is calculated by:

calculation of the line resistance of the telephone connecting line as a function of the measured current flowing via the telephone connecting line and of the applied telephone connecting line measurement feed voltage, calculation of a required telephone connecting line measurement feed voltage, required to produce the predetermined nominal supply current in the calculated line resistance, calculation of an internal voltage drop in the SLIC circuit as a function of an internal resistance of the SLIC circuit and of the predetermined nominal supply current, and by calculation of the required SLIC supply voltage for the SLIC circuit by addition of the calculated telephone connecting line feed voltage and the calculated internal voltage drop in the SLIC circuit.

The SLIC supply voltage is preferably produced by DC/DC conversion of a battery voltage which is applied to a DC/DC converter.

In one preferred embodiment of the method according to the invention, the battery voltage which is applied to the DC/DC converter is pulse-width-modulated by means of a control signal in the monitoring circuit in order to produce the SLIC supply voltage.

The invention furthermore provides a control circuit for regulating the supply voltage of an SLIC circuit, having a monitoring circuit for calculating an SLIC supply voltage which is required to achieve a nominal supply current, and having a DC/DC converter circuit, which is controlled by the monitoring circuit, for converting a battery voltage to the calculated SLIC supply voltage.

The DC/DC converter circuit preferably has a controllable switching device, to which the battery voltage is applied, and has an induction circuit, which is connected to the controllable switching device, for producing the SLIC supply voltage.

In one preferred embodiment of the control circuit according to the invention, the controllable switching device is a transistor.

The transistor is preferably a field-effect transistor.

The gate connection of the field-effect transistor is in this case preferably connected via a control line to the monitoring circuit, with the battery voltage being applied to the source connection and with the induction circuit being connected to the drain connection.

In one particularly preferred embodiment of the control circuit according to the invention, the battery voltage which is applied to the source connection of the field-effect transistor is passed on by means of a control signal, which is received at the gate connection of the field-effect transistor via the control line from the monitoring device, in order to emit a pulse-width-modulated DC voltage signal via the drain or source connection to the induction circuit.

The induction circuit preferably uses mutual induction to produce the SLIC supply voltage from the received pulse-width-modulated DC voltage signal.

The DC/DC converter circuit preferably has a rectifier circuit.

In one further preferred embodiment of the control circuit according to the invention, the DC/DC converter circuit has a smoothing circuit for smoothing the SLIC supply voltage.

The monitoring circuit is preferably connected to a Codec circuit.

In a first embodiment of the control circuit according to the invention, the monitoring circuit is integrated in the SLIC circuit.

In an alternative embodiment of the control circuit according to the invention, the monitoring circuit is integrated in the Codec circuit.

BRIEF DESCRIPTION OF THE DRAWINGS

Preferred embodiments of the method according to the invention and of the control circuit according to the invention for regulating an SLIC supply voltage will be described in the following text with reference to the attached figures in order to explain the features that are essential to the invention. In the figures:

FIG. 2 shows an interface circuit for connection of an analog terminal to a digital switching system, which interface circuit contains a control circuit according to the invention;

FIG. 3 shows a preferred embodiment of the control circuit according to the invention;

DETAILED DESCRIPTION OF THE INVENTION

Figure 1:
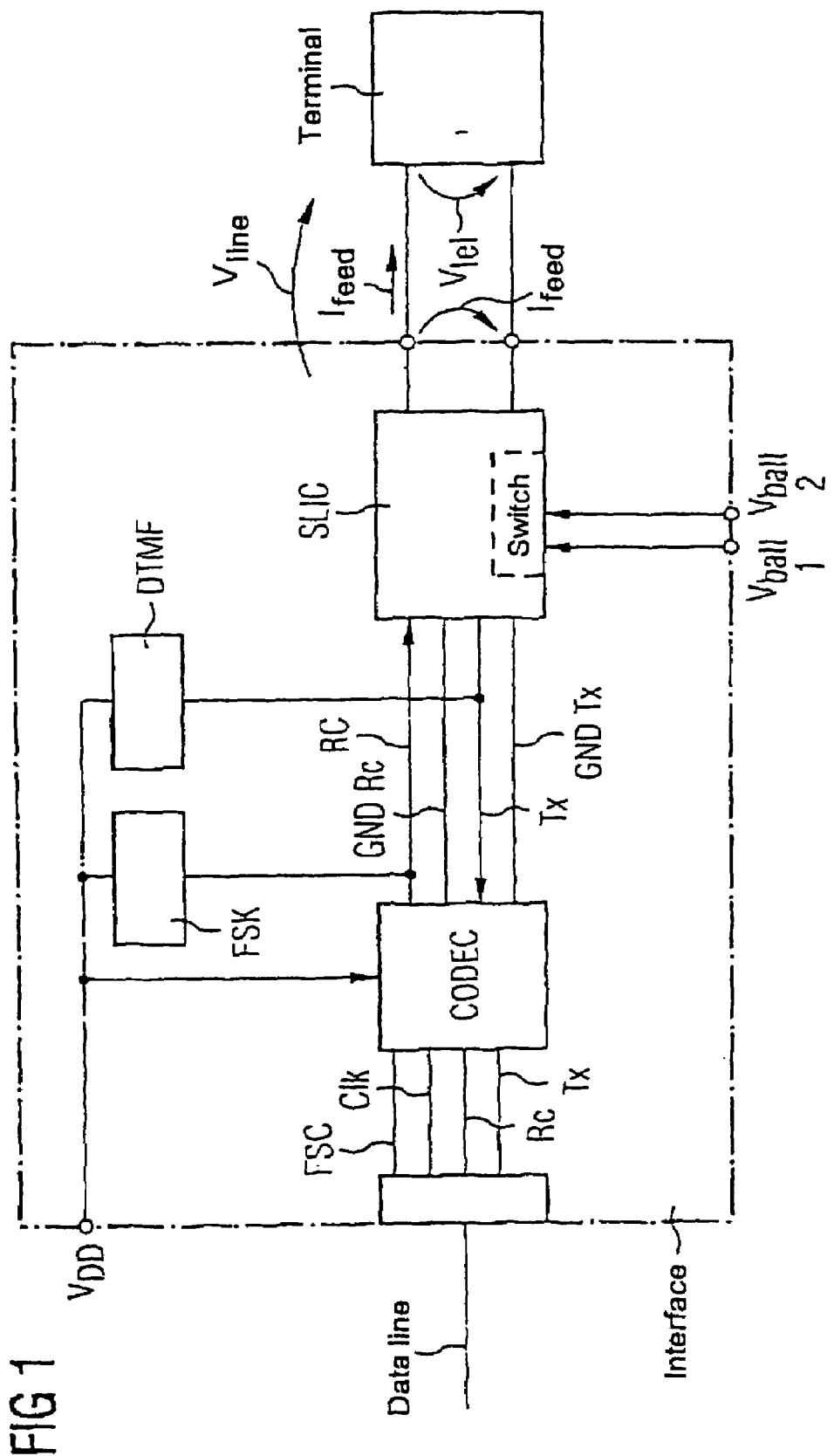
FIG. 1 shows an interface for connection of an analog subscriber terminal to a digital telephone network according to the prior art.

FIG. 2 shows a block diagram of an interface circuit 1 for connection of an analog terminal 2 to at least one data line 3 for transmission of digital signals. The interface circuit 1 contains a connection 4 for connection of the interface circuit 1 to the data transmission line 3. Voice signal information and data information are transmitted in digital form via the data transmission line 3. The connection 4 is connected via a data frame synchronization line 5 (Frame Sync), a clock line 6, a data receiving line 7, a data transmitting line 8 and a reference ground line 9 to a Codec circuit 10. The digital data applied is decoded by the Codec circuit 10, and is converted to analog signals. The Codec circuit 10 is connected via a receiving line 11, a receiving ground line 12, a transmitting line 13 and a transmitting ground line 14 to an SLIC circuit 15 which is provided in the interface circuit 1.

An FSK circuit 16 (FSK: Frequency Shift Keying) is connected via a line 17 to the receiving line 11. A DTMF circuit 18 is connected via a line 19 to the transmitting line 13. The FSK circuit produces the telephone number to be displayed on the terminal 2 when a telephone call is received. Conversely, when an outgoing telephone call is made from the terminal 2, the DTMF circuit 18 produces the telephone number to be displayed on the receiver.

The Codec circuit 10, the FSK circuit 16 and the DTMF circuit 18 are supplied with a supply voltage $V_{DD}$ of, for example, 5 V via a supply voltage line 20 at a supply voltage connection 21. The SLIC circuit 15 has two output connections 22, 23, which are connected to two telephone connecting lines 24, 25 for connection of the analog subscriber terminal 2. The SLIC circuit (SLIC: Subscriber Line Interface Circuit) converts the signal which is present on the four lines 11 to 14 into a two-wire telephone signal. At the same time, the SLIC circuit 15 supplies a telephone supply voltage and a supply current via the telephone connecting lines 24, 25 to the analog subscriber terminal 2.

In the preferred embodiment shown in FIG. 2, the Codec circuit 10 has a control connection 26, which is connected via a control line 27 to a control input 28 of the control circuit 29 according to the invention. The control circuit 29 receives the battery voltage $V_{batt}$, which is applied to one input 32 of the interface circuit 1, via a battery voltage input connection 30 and a voltage line 31. As can be seen from FIG. 2, only one battery voltage $V_{batt}$ is required, so that the circuit complexity for producing the battery voltage is minimal.

The control circuit 29 furthermore has an output 33 for emitting the SLIC supply voltage produced by the control circuit 29 via a supply voltage line 34 to a supply voltage connection 35 of the SLIC circuit 15.

FIG. 3 shows a preferred embodiment of the control circuit 29 according to the invention. The control circuit 29 contains a monitoring circuit 36, which is connected via an internal signal line 37 to the control input 28 of the control circuit 29. The monitoring circuit 36 emits a control signal via a control line 38 to a gate connection 39 of a field-effect transistor 40. The field-effect transistor 40 has a source connection 41, which is connected via a line 42 to the battery supply voltage connection 30 of the control circuit 29. The field-effect transistor 40 also has a drain connection 43, which is connected via an internal line 44 to a first coil 45 in an induction circuit 46. The induction circuit 46 has a second coil 47, which is inductively coupled to the first coil 45 and whose first connection is connected via a rectifier diode 48 and a signal line 49 to the supply voltage output connection 33 of the control circuit 29 for emitting the SLIC supply voltage. The second connections of the two coils 45, 47 of the induction circuit 46 are connected via a ground line 50 to a ground connection 51 of the control circuit 29. The control circuit 29 furthermore contains a capacitor 52, which is connected in parallel with the second coil 47 of the induction circuit 46, in order to smooth the emitted SLIC supply voltage.

The controllable field-effect transistor 40 and the induction circuit 46 together form a controllable DC/DC converter circuit 53. The DC/DC converter circuit 53 is used to convert the battery voltage $V_{battery}$, which is applied to the connection 30, to a desired SLIC supply voltage, which is emitted at the connection 33 to the SLIC circuit 15 shown in FIG. 2.

The required SLIC supply voltage is calculated by the monitoring circuit 36 contained in the control circuit 29. The monitoring circuit 36 contains a calculation unit for this purpose. Depending on the calculated SLIC supply voltage that is required, the monitoring circuit 36 calculates a pulse-width-modulation ratio (7 WVM), and emits a control signal for pulse-width modulation of the battery voltage $V_{batt}$ which is present at the source connection 41, via the control line 38 to the gate connection 39. The pulse-width-modulated DC voltage signal which is applied to the drain connection 43 is passed via the line 44 to the first coil 45 in the induction circuit 46. Mutual induction results in the required supply voltage being produced in the second coil 47 of the induction circuit 46, and this is rectified by the rectifier diode 48. The capacitor 52 smooths the required supply voltage that is produced.

Figure 4:
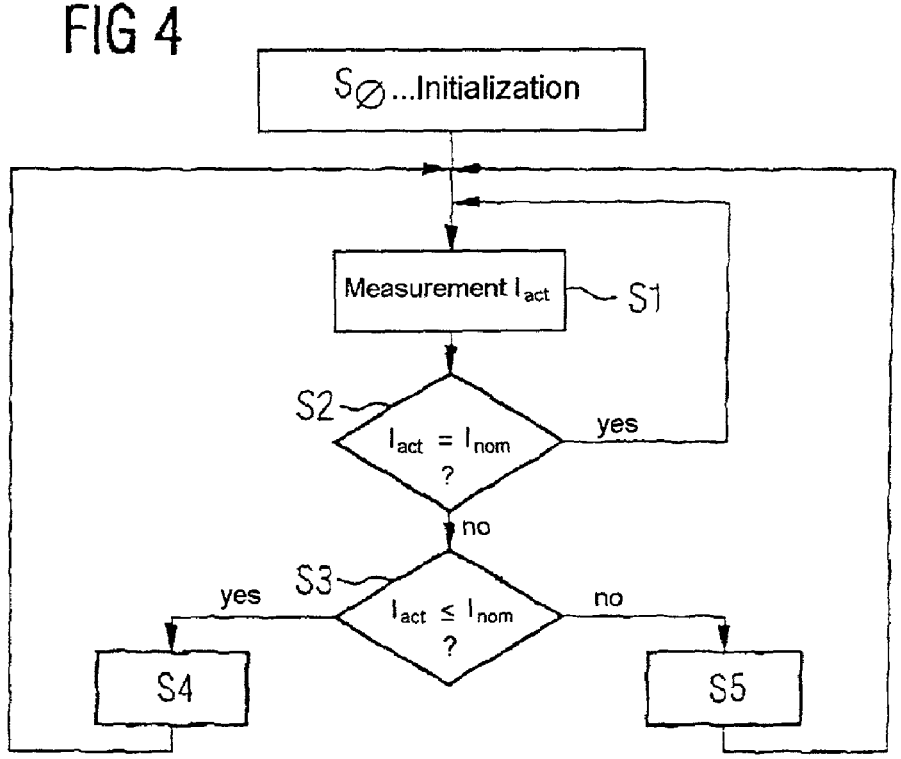
FIG. 4 shows a flowchart of one preferred embodiment of the method according to the invention for regulating the SLIC supply voltage.

FIG. 4 shows a flowchart of a particularly preferred embodiment of the method according to the invention for regulating an SLIC supply voltage.

In an initialization step $S_0$, a feed voltage $V_{feed0}$ is supplied from the SLIC circuit 15 to the telephone connecting lines 24, 25.

In step S1, the Codec circuit 10 measures the actual current $I_{act}$ flowing on the telephone connecting lines 24, 25, and the appropriate control information data is emitted via the line 27 to the monitoring circuit 36 that is contained in the control circuit 29. The monitoring circuit 36 contains a memory apparatus, in which a predetermined required supply current for analog subscriber terminals 2 is stored.

A check is carried out in step S2 to determine whether the measured actual current $I_{act}$ corresponds to the required supply current $I_{nom}$ for the subscriber terminal 2. If this is the case, the process returns to step S1 in order to measure the actual current $I_{act}$ once again.

If the actually measured current flowing via the telephone connecting lines 24, 25 differs from the required supply current $I_{nom}$, a check is carried out in step S3 to determine whether the actually measured current $I_{act}$ is less than the required supply current $I_{nom}$. If this is the case, the SLIC supply voltage is increased in step S4.

If it is found in step S3 that the current actually flowing on the telephone connecting lines 24, 25 to the subscriber terminal 2 is greater than the desired, predetermined supply current $I_{nom}$, the SLIC supply voltage is correspondingly reduced in step S5.

The required SLIC supply voltage is calculated as follows. First of all, depending on the current $I_{act}$ actually flowing and as measured in step S1, the line resistance $R_{line}$ of the telephone connecting lines 24 and the resistance of the telephone $R_{telephone}$ 25 are calculated as a function of the measured current $I_{act}$ and the telephone line feed voltage $V_{feed}$ applied by the SLIC circuit 15 to the connections 22, 23. This is used to calculate the required telephone line feed voltage $V_{feed\ nom}$, for which the predetermined nominal supply current $I_{nom}$ is produced by the monitoring device 36 within the control circuit 29. Furthermore, the internal voltage drop $V_{DROP}$ in the SLIC circuit 15 is calculated as a function of a known, constant internal resistance $R_{internal}$ of the SLIC circuit 15 and the predetermined nominal supply current $I_{nom}$. The monitoring circuit 36 then calculates the required supply voltage to be applied to the supply voltage connection 35 for the SLIC circuit 15, as a function of the required telephone line feed voltage $V_{feed\ nom}$ and the internal voltage drop $V_{DROP}$ in the SLIC circuit 15, by adding the required telephone line feed voltage $V_{feed\ nom}$ and the constant internal voltage drop $V_{DROP}$.

The monitoring circuit 36 uses the calculated required supply voltage for the SLIC circuit 15 to calculate a pulse-width-modulation ratio PWMV for driving the gate connection 39 via the control line 38. The width of the pulses in the pulse-width-modulated DC voltage signal at the drain connection 43 of the field-effect transistor 40 is increased in order to increase the supply voltage for the SLIC circuit 15, as emitted by the output 33 from the induction circuit 46. Conversely, the supply voltage for the SLIC circuit 15 is reduced by reducing the width of the pulses in the pulse-width-modulated DC voltage signal at the drain connection 43 of the field-effect transistor 40.

The monitoring circuit 36 in the control circuit 29 can be integrated in the Codec circuit 10, in a first embodiment. In an alternative embodiment, the monitoring circuit 36 is integrated in the SLIC circuit 15. Integration of the monitoring circuit 36 in the Codec circuit 10 offers the advantage that the monitoring circuit can be constructed in the same way as the Codec circuit 10 using CMOS technology, and thus itself requires only a low supply voltage $V_{DD}$. The supply voltage for the SLIC circuit is dynamically matched to the line length L of the telephone connecting lines 24, 25.

Figure 5:
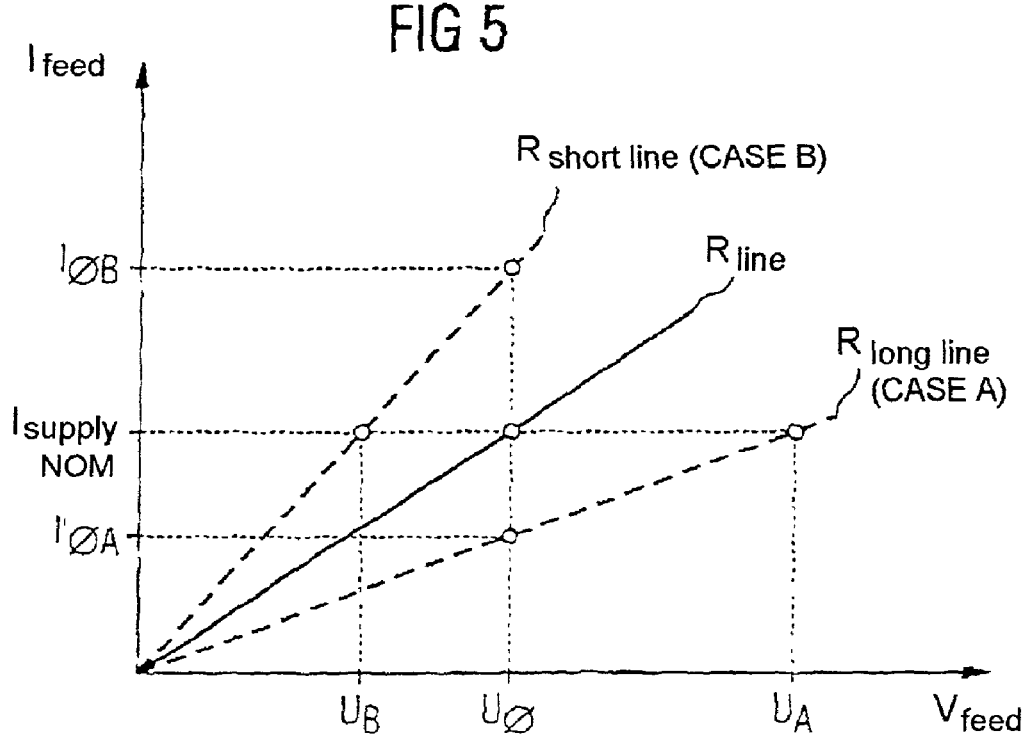
FIG. 5 shows a diagram to explain the method of operation of the control circuit according to the invention.

FIG. 5 shows a diagram to explain the method of operation of the control method according to the invention.

If a feed voltage $V_{feed}$ of magnitude $U_0$ is emitted by the SLIC circuit 15, in the initialization step $S_0$, to the telephone connecting lines 24, 25, whose resistance is $R_{line}$, the current $I_{feed}$ that is fed in corresponds precisely to the required nominal supply current $I_{supply\ nom}$.

If, in a case A, the telephone connecting lines 24, 25 are relatively long, the application of the original measurement voltage $U_0$ leads to an excessively low feed current $I_{0a}$ flowing via the telephone connecting lines 24, 25. Thus, in order that the desired supply current flows, the control circuit 29 increases the SLIC supply voltage in such a manner that a feed voltage $V_{feed}$ with a value $U_A$ is applied to the output connections 22, 23 of the SLIC circuit 15.

If, conversely, in a case B, the telephone connecting lines 24, 25 are very short, then an excessively high feed current $I_{0b}$ flows when a measurement voltage $U_0$ is applied. In a corresponding manner, the control circuit 29 reduces the supply voltage from the SLIC circuit 15 in such a manner that the SLIC circuit 15 emits a lower feed voltage $V_{feed}$ of magnitude $U_B$ at the output connections 22, 23.

The required nominal supply current for the subscriber terminal 2 is defined at a fixed value in every country, and is typically in a range between 20 and 50 mA.

The supply voltages set at the input connection 35 of the SLIC circuit 15 by the control circuit 29 are typically in the range from −15 V to −60 V with respect to ground.

Since the voice signals are isolated from the high battery voltages, this results in an improvement in the voice quality and a reduction in the production costs. Signal crosstalk, temperature changes and increases in the applied battery voltage have no effect on the sensitive transducers within the Codec circuit 10 when using the control circuit according to the invention.

Minimizing the power loss that occurs in the SLIC circuit 15 simplifies the cooling and dissipation of the heat that is produced, thus allowing the production costs for the interface circuit 1 to be reduced. Since only one battery voltage $V_{batt}$ need be produced for application to the connection 32 of the control circuit 1, this avoids further circuitry complexity.

The supply voltage for the SLIC circuit 15 is matched to the actual telephone connection characteristics, and the sharing of the Codec circuit and the SLIC circuit in an integrated control circuit 29 allows thermal decoupling, and possibly also crosstalk between analog and digital signals, to be avoided.

LIST OF REFERENCE SYMBOLS

1 Interface circuit
2 Analogue terminal
3 Data line
4 Connection
5 Frame synchronization line
6 Clock line
7 Receiving line
8 Transmitting line
9 Earth line
10 Codec circuit
11 Receiving line
12 Receiving earth line
13 Transmitting line
14 Transmitting earth line
15 SLIC circuit
16 FSK circuit
17 Line
18 DTMF circuit
19 Line
20 Supply voltage line
21 Supply connection
22 SLIC circuit output
23 SLIC circuit output
24 Telephone connecting line
25 Telephone connecting line
26 Connection
27 Line
28 Input
29 Control circuit
30 Battery voltage connection
31 Line
32 Connection
33 Control circuit output
34 Supply voltage line
35 Supply connection
36 Monitoring circuit
37 Line
38 Control line
39 Gate connection
40 Field-effect transistor
41 Source connection
42 Line
43 Drain connection
44 Line
45 Coil
46 Induction circuit
47 Coil
48 Rectifier diode
52 Smoothing capacitor
53 DC/DC converter

The invention claimed is:

1. A method for regulating with minimum power loss a subscriber line interface circuit (SLIC) supply voltage of an SLIC circuit provided within an interface circuit for connecting an analog subscriber terminal to a digital data transmission line, wherein the method comprises the following steps:
    (a) applying a telephone line measurement feed voltage ($V_{meas}$) to telephone connecting lines connecting said analog subscriber terminal to said SLIC circuit;
    (b) measuring a feed current ($I_{feed}$) which flows via the telephone connecting lines when the telephone line measurement feed voltage is applied by means of a coder/decoder (CODEC) circuit of said interface circuit to generate control information data which are emitted to a monitoring circuit of said interface circuit;
    (c) wherein the monitoring circuit calculates, in response to the control information data indicating the actual measured feed current ($I_{feed}$) and data stored in a memory of said monitoring circuit indicating a predetermined nominal supply current ($I_{nom}$) for said analog subscriber terminals, the required SLIC supply voltage for said SLIC circuit and applies a control signal to a DC/DC converter circuit, wherein the calculation of the SLIC supply voltage for the SLIC circuit comprises the following steps:
        (i) calculating a line resistance ($R_{line}$) of the telephone connecting lines as a function of the control information data indicating the actual measured feed current ($I_{feed}$) and the applied telephone line measurement feed voltage ($V_{meas}$);
        (ii) calculating a telephone line feed voltage ($V_{feed}$) which produces the predetermined nominal supply current ($I_{nom}$) through the calculated line resistance ($R_{line}$);
        (iii) calculating an internal voltage drop ($V_{drop}$) in the SLIC circuit as a function of an internal resistance ($R_{internal}$) of the SLIC circuit and of the predetermined nominal supply current ($I_{nom}$); and
        (iv) calculating the SLIC supply voltage for the SLIC circuit by addition of the calculated telephone line feed voltage ($V_{feed}$) and the calculated internal voltage drop ($V_{drop}$) in the SLIC circuit; and
    (d) wherein the DC/DC converter circuit converts a battery voltage ($V_{bat}$) to the calculated required SLIC supply voltage in response to the control signal received from said monitoring circuit.

2. The method as claimed in claim 1, wherein the control signal applied by said monitoring circuit to said DC/DC converter circuit is a pulse width modulated control signal, wherein the pulse width modulation ratio of said control signal depends on the required SLIC supply voltage.

3. An interface circuit for connecting an analog subscriber terminal to a digital data transmission line, the interface circuit comprising:
   (a) a subscriber line interface circuit (SLIC) circuit which is supplied by an SLIC supply voltage and produces a telephone line feed voltage ($V_{feed}$) applied to the telephone lines connecting said analog subscriber terminal to said SLIC circuit;
   (b) a coder/decoder (CODEC) circuit for connecting said SLIC circuit to said data transmission line wherein the CODEC circuit measures a feed current ($I_{feed}$) which flows via said telephone connecting lines when the telephone line feed voltage ($V_{feed}$) is applied to said telephone connecting lines to generate control information data;
   (c) a monitoring circuit which calculates, in response to the control information data indicating the actual measured feed current ($I_{feed}$) and data stored in a memory of said monitoring circuit indicating a predetermined nominal supply current ($I_{nom}$) for said analog subscriber terminal, a required SLIC supply voltage for said SLIC circuit, wherein the monitoring circuit calculates the required SLIC supply voltage for the SLIC circuit through steps comprising:
      (i) calculating a line resistance ($R_{line}$) of the telephone connecting lines as a function of the control information data indicating the actual measured feed current ($I_{feed}$) and the applied telephone line measurement feed voltage ($V_{meas}$);
      (ii) calculating a telephone line feed voltage ($V_{feed}$) which produces the predetermined nominal supply current ($I_{nom}$) through the calculated line resistance ($R_{line}$);
      (iii) calculating an internal voltage drop ($V_{drop}$) in the SLIC circuit as a function of an internal resistance ($R_{internal}$) of the SLIC circuit and of the predetermined nominal supply current ($I_{nom}$); and
      (iv) calculating the SLIC supply voltage for the SLIC circuit by addition of the calculated telephone line feed voltage ($V_{feed}$) and the calculated internal voltage drop ($V_{drop}$) in the SLIC circuit; and
   (d) a DC/DC circuit which converts a battery voltage ($V_{batt}$) to the calculated required SLIC supply voltage in response to a control signal received from said monitoring circuit.

4. The interface circuit as claimed in claim 3, wherein the DC/DC converter has a controllable switching device for application of the battery voltage ($V_{batt}$) and has an induction circuit, which is connected to the switching device, for producing the SLIC supply voltage.

5. The interface circuit as claimed in claim 4, wherein the controllable switching device is a transistor.

6. The interface circuit as claimed in claim 5, wherein the transistor is a field-effect transistor.

7. The interface circuit as claimed in claim 6, wherein the field-effect transistor has a gate connection which is connected via a control line to the monitoring circuit, a first main connection for application of the battery voltage ($V_{batt}$), and a second main connection for connection to the induction circuit.

8. The interface circuit as claimed in claim 7, wherein the battery voltage ($V_{batt}$) which is applied to the source connection of the field-effect transistor can be switched by means of a control signal, which is received at the gate connection of the field-effect transistor via the control line from the monitoring device, in order to emit a pulse-width-modulated DC voltage signal via the second main connection to the induction circuit.

9. The interface circuit as claimed in claim 4, wherein the induction circuit produces the SLIC supply voltage by means of mutual inductance from the pulse-width-modulated DC voltage signal.

10. The interface circuit as claimed in claim 3, wherein the DC/DC converter is followed by a diode.

11. The interface circuit as claimed in claim 3, wherein the DC/DC converter is followed by a smoothing circuit for smoothing the SLIC supply voltage.

12. The interface circuit as claimed in claim 3, wherein the monitoring circuit is integrated in the SLIC circuit.

13. The interface circuit as claimed in claim 3, wherein the monitoring circuit is integrated in the CODEC circuit.

* * * * *